United States Patent
Katsuki et al.

(10) Patent No.: US 12,536,785 B2
(45) Date of Patent: Jan. 27, 2026

(54) DOMAIN VECTOR-BASED DOMAIN ADAPTATION FOR OBJECT DETECTION AND INSTANCE SEGMENTATION

(71) Applicant: INTERNATIONAL BUSINESS MACHINES CORPORATION, Armonk, NY (US)

(72) Inventors: Takayuki Katsuki, Tokyo (JP); Haoxiang Qiu, Tokyo (JP); Tomoya Sakai, Tokyo (JP); Tadanobu Inoue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 18/111,507

(22) Filed: Feb. 17, 2023

(65) Prior Publication Data

US 2024/0282091 A1    Aug. 22, 2024

(51) Int. Cl.
*G06V 10/00* (2022.01)
*G06V 10/774* (2022.01)
*G06V 10/82* (2022.01)

(52) U.S. Cl.
CPC .......... *G06V 10/82* (2022.01); *G06V 10/7753* (2022.01)

(58) Field of Classification Search
CPC ............ G06N 3/08; G06N 3/02; G06N 3/082; G06N 3/092; G06N 3/0454; G06N 3/0475; G06N 3/0464; G06V 10/82; G06V 10/761; G06V 10/762; G06V 10/7753

See application file for complete search history.

(56) References Cited

U.S. PATENT DOCUMENTS

| | | | |
|---|---|---|---|
| 10,068,171 B2 * | 9/2018 | Wshah | G06V 10/806 |
| 10,915,792 B2 * | 2/2021 | Tsai | G06F 18/2155 |
| 10,956,817 B2 * | 3/2021 | Oliveira Pinheiro | G06N 3/045 |
| 11,222,210 B2 * | 1/2022 | Sharma | G06F 18/2411 |
| 11,443,193 B2 * | 9/2022 | Li | G06N 20/00 |
| 11,544,503 B2 * | 1/2023 | Tensmeyer | G06V 30/19147 |
| 11,604,943 B2 * | 3/2023 | Tsai | G06V 20/70 |
| 11,842,517 B2 * | 12/2023 | Lyons | G06V 20/653 |
| 12,019,726 B2 * | 6/2024 | Das | G06N 5/022 |
| 2019/0108444 A1 | 4/2019 | Song et al. | |
| 2020/0082221 A1 | 3/2020 | Tsai et al. | |
| 2020/0211567 A1 | 7/2020 | Wang et al. | |
| 2024/0078318 A1 * | 3/2024 | Katsuki | G06F 21/577 |
| 2024/0202907 A1 * | 6/2024 | Manikani | G06V 10/82 |

(Continued)

OTHER PUBLICATIONS

He, K. et al., "Mask R-CNN", arXiv:1703.06870v3 [cs.CV] 24 (2018), 12 pgs.

(Continued)

*Primary Examiner* — Amir Alavi
(74) *Attorney, Agent, or Firm* — CHIP LAW GROUP

(57) ABSTRACT

A computer-implemented method for domain adaptation of an object detection model includes obtaining a domain vector for a domain from one or more images in the domain, the domain vector representing the property of the domain. The domain vector is input into a fully connected layers in the object detection model. A domain-specific result of the object detection model is provided as output. The method can further include computing a domain tensor and inputting the domain tensor into convolutional layers in the object detection model.

20 Claims, 11 Drawing Sheets

(56) References Cited

U.S. PATENT DOCUMENTS

2024/0282091 A1* 8/2024 Katsuki .................. G06V 10/82

OTHER PUBLICATIONS

Su, P. et al., "Adapting Object Detectors with Conditional Domain Normalization", arXiv:2003.07071v2 [cs.CV] (2020), 22 pgs.
Kumagai, A. et al., "Transfer Anomaly Detection by Inferring Latent Domain Representations", NEUR IPS (2019), 11 pgs.
No Author, "Detectron 2", https://github.com/facebookresearch/detectron2, dated May 6, 2025, 4 pages.

* cited by examiner

DOMAIN VECTOR-BASED DOMAIN ADAPTATION FOR OBJECT DETECTION AND INSTANCE SEGMENTATION

BACKGROUND

Technical Field

The present disclosure generally relates to machine learning technology, and more particularly, to a computer-implemented method, a computer system, and a computer program product for enabling classical planning in interactive environments with incomplete models.

Description of the Related Art

Automation of visual inspection has been playing a salient role in speeding up the inspection process and reducing the danger to human engineers in many industrial fields. For example, defects in civil infrastructures can be detected by using drone images. The detection is done at a fine-grained level with instance segmentation models, which have advanced in recent years. However, there is limited generalization capability of such models into data distinct from the training data. Therefore, even with sufficient labeled training data in some domains (referred to herein as "source domains"), before inspecting another unseen domain (referred to herein as the "target domain"), preparing additional labeled training data for the domain is usually required to retrain the model.

SUMMARY

In one embodiment, a computer-implemented method for domain adaptation of an object detection model includes obtaining a domain vector for a domain from one or more images in the domain, the domain vector representing the property of the domain. The domain vector is input into a fully connected layer in the object detection model. A domain-specific result of the object detection model is provided as output.

In one embodiment, a computer-implemented method for domain adaptation of an object detection model includes computing a domain tensor and inputting the domain tensor into convolutional layers of the object detection model. The domain tensor can further be input into a mask head of the object detection model. A domain-specific result of the object detection model can be provided as output. In some embodiments, the object detection model is a mask region-based convolutional neural network (Mask R-CNN) model.

By virtue of the concepts discussed herein, methods for optimizing domain adaptation for instance segmentation to address the rapid adaptation of visual inspection on an unseen target domain are provided that provides an artificial intelligent agent with domain adaptation capability without the need to either retrain the model on the target domain or prepare labeled target data. Such a system improves conventional instance segmentation models by providing performance in unsupervised domain adaptation, where the model is trained on the source domain without using any data from the target domain.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
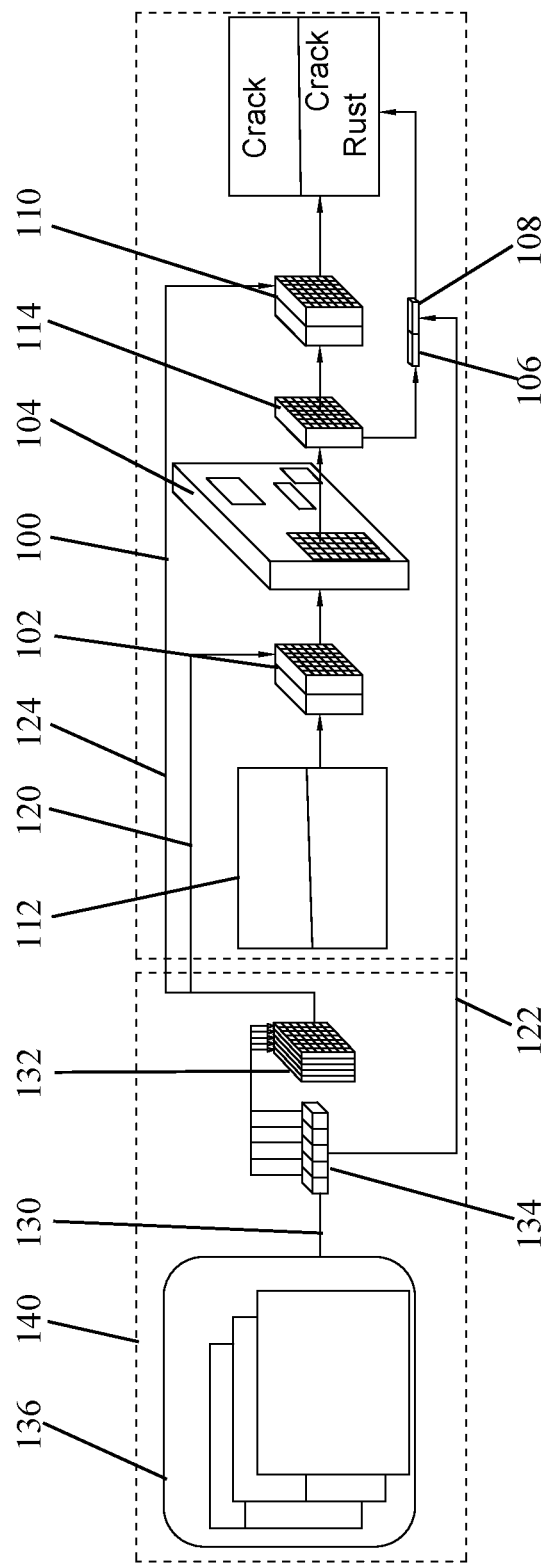
FIG. 1 shows a schematic representation of an overall architecture of a domain vector-based domain adaptation for object detection and instance segmentation, according to an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Aspects of the present disclosure provide systems and methods for optimizing domain adaptation for instance segmentation to address the rapid adaptation of visual inspection on an unseen target domain. Mask R-CNN can be enhanced with a domain adaptation capability that can mitigate the cost of labeling data in the target domain while maintaining generalization performance by leveraging accumulated training data on source domains. Domain adaptation can be performed by controlling the prediction to be target domain-specific with a domain vector, which represents the domain property. Since the domain vector can be inferred from sets of unlabeled images in a domain by Deep sets, the system and methods of the present disclosure provide a domain adaptation capability without the need to either retrain the model on the target domain or prepare labeled target data. The accuracy of the system and methods of the present disclosure can be confirmed on domain adaptation through real-world visual inspection tasks.

As discussed in greater detail below, aspects of the present disclosure can provide an enhancement of Mask R-CNN with a domain adaptation capability. The systems and methods described herein can control its prediction to be target domain-specific by a domain vector, which represents the domain property. An inference pipeline for the domain vector can be modeled with Deep sets. The pipeline infers the vector from a set of unlabeled images on a domain and does not require the model to be retrained on the target domain nor the labeled target data to be prepared, which contributes to scenarios with few or no labeled target samples. Experiments on real-world visual inspection tasks can show the efficiency of the systems and methods of the present disclosure for domain adaptation. One or more of the methodologies discussed herein may obviate a need for time consuming re-training of a model on a target data set. This may have the technical effect of reducing computing resources used by one or more devices within the system. Examples of such computing resources include, without limitation, processor cycles, network traffic, memory usage, storage space, and power consumption.

For example, the systems and methods of the present disclosure can be used to detect defects in civil infrastructure by using drone images, where the detection is done at a fine-grained level with object detection or instance segmentation models. Domain adaptation can help use a model trained with training data on source domains for the prediction of the target domain while maintaining generalization performance. The target domain may include images, such as drone images, of before unseen civil infrastructure, where the methods and systems of the present disclosure can be used to detect defects therein using source domain-trained instance segmentation models. In some embodiments, the methods may be useful to detect defects, such as algae, crack, crack (net-crack), crack with precipitation, rust, and/or spalling on civil infrastructure such as bridges, pilings or the like. As described in greater detail below, embodiments of the present disclosure construct an object detection/instance segmentation model for target domain without either retraining on the target domain or preparing labeled target domain data.

Let x be an image and Y be an instance segmentation result for visual inspection, which includes a bounding box, a segmentation mask, and the corresponding classification results. Intuitively, Y specifies each position of each defect and the corresponding defect class, such as crack and rust. It can be assumed that there are K-number of datasets as source domains for training the instance segmentation model, and a set of data in the k-th domain is represented as $\mathcal{D}^{\{k\}} \equiv \{(x_n^{\{k\}}, Y_n^{\{k\}})\}_{n=1}^{N_k}$, which is $N_k$ pairs of images and instance segmentation labels. Thus, the training data s { $\mathcal{D}^{\{k\}}\}_{k=1}^{K}$. A dataset on the target domain is a set of unlabeled images $\mathcal{D}^{\{T\}} \equiv \{(x_n^{\{T\}}\}_{n=1}^{N_T}$. It should be noted that semi-supervised domain adaptation scenarios can be seamlessly handled where there is partial access to the labeled training data on the target domain by considering the labeled target dataset as an additional source domain.

It can be assumed that instance segmentation results are domain-specific due to a domain vector, z, which represents the property of each domain and is an L-dimensional continuous variable, $z \in \mathbb{R}^L$ ($L \in \mathbb{N}$). For the k-th domain, prediction function is defined that outputs the domain specific instance segmentation results as conditioned on the domain vector $z^{(k)}$ of the k-th domain:

$$Y(x \mid z^{(k)}) \equiv f_{\theta_f}(x, z^{(k)}), \quad (1)$$

where $f_{\theta_f}$ is the instance segmentation model and $\theta_f$ is its parameter shared among all domains.

Through z, the model $f_{\theta_f}$ is aware of the domain difference explicitly. Even when the same image x is input into the model, the prediction results can be different due to z. A specific construction of this domain-specific prediction function can be based on Mask R-CNN and the pipeline for inferring the domain vector as discussed below.

To train the model, $\theta_f$ can be optimized by minimizing the summation of the loss functions over K number of source domains, where the loss for the k-th domain with the corresponding $z^{\{k\}}$ is $$\mathcal{L}^{\{k\}} \equiv \mathcal{L}_{box}(\mathcal{D}^{\{k\}} \mid z^{\{k\}}) + \mathcal{L}_{mask}(\mathcal{D}^{\{k\}} \mid z^{\{k\}}) + \mathcal{L}_{class}(\mathcal{D}^{\{k\}} \mid z^{\{k\}}) \quad (2)$$

where $\mathcal{L}^{\{k\}}$ represents a multi-task loss including a bounding box loss, $\mathcal{L}_{box}$, a segmentation mask loss $\mathcal{L}_{mask}$, and a classification loss, $\mathcal{L}_{class}$.

By using the optimized $\theta_f$, Y can be predicted for data on the target domain as $Y=f_{\theta_f}(x, z^{\{T\}})$, where $z^{\{T\}}$ is the domain vector for the target domain.

The architecture of Mask R-CNN 100 is shown in FIG. 1. Mask R-CNN 100 includes a convolutional backbone network 102, regions of interest (ROI) head 104, and three output components called the class 106, box 108, and mask heads 110. An input image 112 is first converted into intermediate representation vectors with the convolutional backbone 102 network, which is the pre-trained efficient net, applied over an entire image. Then, from the representations, the ROI head 104 produces attentions 114 called ROI or region proposals, which specify a set of rectangular regions in an image to be focused on in the subsequent computations. For each region proposed by the ROI head 104, the box, class and mask heads respectively compute the bounding box, classification result, and segmentation mask.

According to aspects of the present disclosure, $z^{\{k\}}$ can be input into each of the ROI head 104, the class and box 106, 108, and the mask head 110 (as shown by arrows 120, 122, 124, respectively) to make their predictions domain-specific as Y $(x|z^{\{k\}})$ in accordance with the domain vector 130 $z^{\{k\}}$ for efficient domain adaptation. The domain-specific prediction function for the class, box, and mask heads is defined for each region proposal, ψ, by the ROI head and the corresponding input representations, $h_\psi$, as $$Y_\psi \equiv G_{\{box,class,mask\}}(h_\psi, z^{(k)}) \text{ where,} \quad (3)$$

$$\psi \equiv G_{ROI}(H, z^{(k)}), \quad (4)$$

where:
H is the input representation for the ROI head,
$G_{\{box,class,mask\}}$ represents the output layers in the class, box, and mask heads,
$G_{ROI}$ is the output layer in the ROI head, and
each element in $\psi$ represents each position of the rectangular region with their sizes.

The region proposals $\psi$ are also imposed to be domain-specific conditioned on $z^{\{k\}}$ in the proposed model since once the ROI head does not select regions, they are ignored in the subsequent layers. It should be noted that the class, box, and mask heads conduct computations for each region proposed by the ROI head but take input representations directly from the backbone network. Thus, inputting $z^{\{k\}}$ into the ROI head along with the other heads is not redundant.

The output layers in the class and box heads are defined with fully-connected layers, and the input representations $h_\psi$ are a flattened vector. Thus, the domain vector 130 $z^{\{k\}}$ into these layers by concatenating $z^{\{k\}}$ with $h_\psi$. However, the output layers of the ROI and mask heads are defined with a convolutional layer. The input representations of the convolutional layer form a tensor whose size is $C \times M_v \times M_h$, respectively corresponding to channel, vertical coordinate, and horizontal coordinate dimensions. The inputting of the domain vector 130 into the layers is done for a fully connected output layer by concatenating the domain vector 130 and a latent representation vector from former layers of the fully connected output layer as a single vector, and using the single vector as an input of the fully connected output layer. In some embodiments, a domain vector and the latent representation vector from former layers of the fully connected output layer are input into a bilinear layer as its two different input vectors. A single vector can be computed as an output of the bilinear layer and the single vector can be used as an input for a fully connected layer. The bilinear layer can change the nonlinear operation for the latent representation vector in the network according to the domain vector. This means that different nonlinear operations can be applied for different domains.

The domain vector 130 $z^{\{k\}}$ can be enhanced into a domain tensor 132, $Z^{\{k\}}$, and $Z^{\{k\}}$ can be concatenated with the input tensor to input $z^{\{k\}}$ into the ROI and mask head computations. The $(l, m_v, m_h)$ element of $Z^{\{k\}}$ is defined as $$Z^{\{k\}}_{l,m_v,m_h} \equiv z^{\{k\}}_l \quad (5)$$

The elements of the tensor whose first indexes are l and have the same values over all their second and third indexes $(m_v, m_h)$, and their values are the same as that of the l-th element of the original $z^{\{k\}}$. The size of the domain tensor is $L \times M_v \times M_h$, where L is the same as the number of elements of $z^{\{k\}}$, $M_v$ and $M_h$ are the same as the size of the input tensors. $Z\{k\}$ can be concatenated with the input tensor along the channel dimension, where the size of the resultant input tensor becomes $(C+L) \times M_v \times M_h$. This operation corresponds to considering each element in $z^{\{k\}}$ as additional channels in the input tensor.

The pipeline for inferring the domain vector z can be modeled with Deep sets 134, which is the deep neural network for sets, not single instances, as $$z^{\{k\}}(X^{\{k\}}) \equiv \rho_{\theta_\rho}\left(\frac{1}{N_k}\sum_{x \in X^{\{k\}}} \eta_{\theta_\eta}, (B(x))\right) \quad (6)$$

where $X^{\{k\}}$ represents a set of images 136 in $\mathcal{D}^{\{k\}}$, each of $\rho$ and $\eta$ is modeled by a fully-connected layer, and B is the backbone network for $\eta$, which is also the pre-trained efficient net for the feature extraction from images. This specific architecture including $\rho$ and $\eta$ provides a permutation invariant due to the average. First, each image with $\eta$ is converted, and then the average is taken over the set, and finally the function $\rho$ is applied. The pipeline for domain adaptation 140 is shown in FIG. 1. From the definition of the domain vector 130 in Equation (6), above, the domain vector 130 is computed once for a set. The domain vector 130 does not need to be computed for each image.

It should be noted that $\theta_\rho$ and $\theta_\eta$ respectively are the parameters for $\rho$ and $\eta$. The same objective function can be used with Mask R-CNN in Equation (2), above, for training $\theta_\rho$ and $\theta_\eta$, and the training is done accompanied with that for Mask R-CNN. Mask R-CNN and Deep sets are trained to compute Y ($x|z^{\{k\}}$) tailored to the k-th domain in accordance with $z^{\{k\}}$ while generalizing the inference for z among domains. Since the parameters for all functions are shared among all domains, retraining is not required, even for $\theta_\rho$ and $\theta_\eta$, on the target domain. The domain vector 130 can be inferred from $\mathcal{D}^{\{T\}}$ for the target domain and can be input into Mask R-CNN through the architecture with the domain adaptation pipeline according to aspects of the present disclosure.

Figure 2:
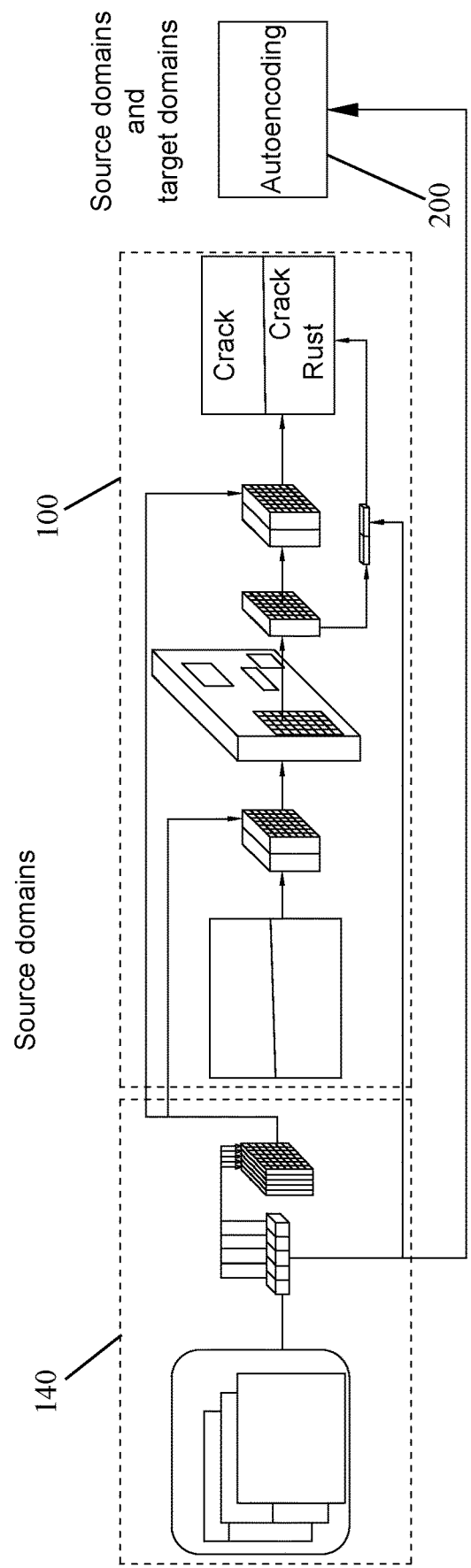
FIG. 2 illustrates how the overall architecture of FIG. 1 can be used to validate performance with unsupervised learning on target domain, according to an illustrative embodiment.

Referring to FIG. 2, a domain-vector based approach for an autoencoder 200 has a similar procedure with the architecture described above in terms of domain adaptation. However, the domain vector-based approach cannot readily be applied to state-of-the-art visual inspection methods, such as Mask R-CNN. This is because convolutional output layers need to be handled. This limitation, however, is overcome with the tensor enhancement using the domain tensor 132 as described above.

The effectiveness of the above described approach in the task of visual inspection on real-world civil infrastructure data is demonstrated. Civil infrastructure data was used, which contains images collected with drones flying around structures and the corresponding labels provided by human engineers. Each defect in an image is detected, with six categories: algae, crack, crack (net-crack), crack with precipitation, rust, and spalling. Two different datasets were used, so, sequentially, one dataset is considered as the source domain and the other as the target domain. Because there is only a single source domain, the data augmentation technique is used to produce multiple domains synthetically to maintain the generalization capability of inferring z. An image was enhanced in the source domain into multiple augmented images and each one was considered as an image from a different domain. The augmentation methods such as GaussianSmoothing with the parameters 5 and 15, Gray-Scale, ChangeBrightness with the parameters 0.8 and 1.2, and ChangeContrast with the parameters 0.8 and 1.2 were applied. Thus, a single domain was enhanced into eight domains. Twenty percent of the training set was randomly sampled for use as a validation set to determine the best hyperparameters.

The model described above, according to aspects of the present disclosure, was compared with two baselines: Mask R-CNN and Fine-tuning. Mask R-CNN is a state-of-the-art method on instance segmentation, but it does not use domain adaptation, where the model is trained only on the target domain and the model is tested on the test set on the target domain. Fine-tuning is Mask R-CNN with domain adaptation, where the model is trained on the source domains, the model is tuned on the target domain, and finally, the model is tested on the test set on the target domain.

The impact of inputting the domain vector into multiple layers in Mask R-CNN was initially investigated. The proposed model, as described above, was evaluated with different configurations, where the domain vector is input into (1) the class and box, (2) the ROI head, (3) the mask head, and (4) all heads. In this experiment, it is shown how the performance in unsupervised domain adaptation, where the model was trained on the source domain without requiring any prior knowledge of the target domain, such as the need to use any data from the target domain or the need for any labelled images from the target domain. The average performance of the most important visual inspection metric was reported as the mean of intersection over union (mIoU).

Figure 3:
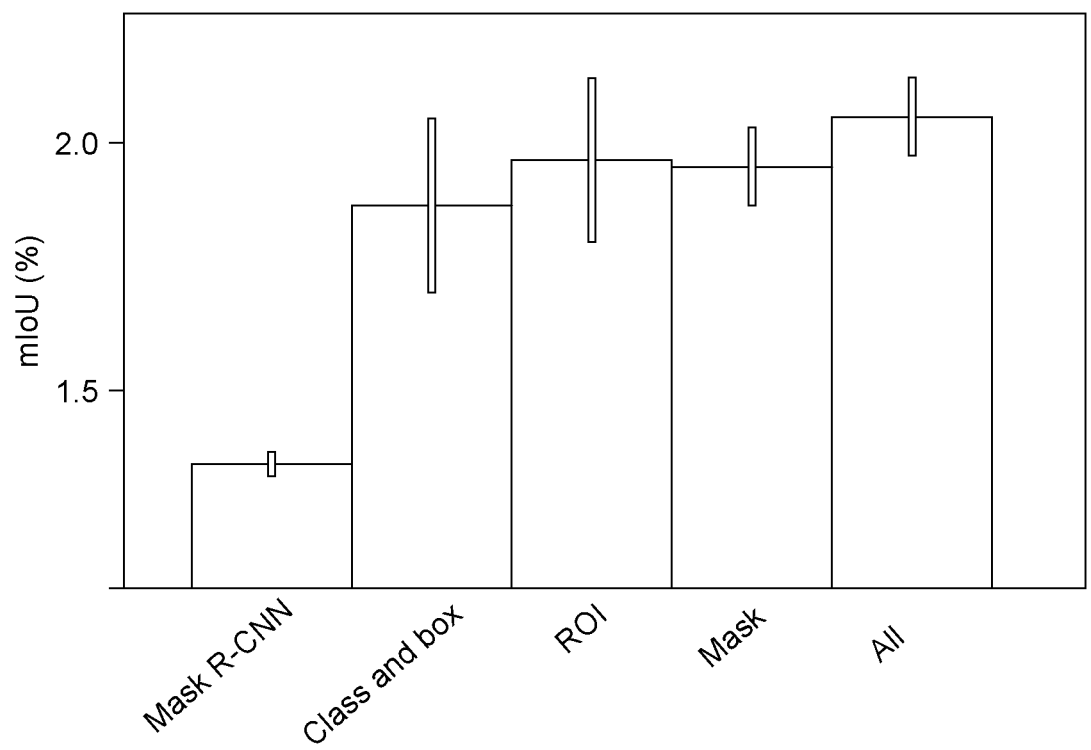
FIG. 3 illustrates a graph showing results of a ablation study, comparing conventional Mask Region-Based Convolutional Neural Network (Mask R-CNN) processes with methods according to illustrative embodiments.
Figure 4:
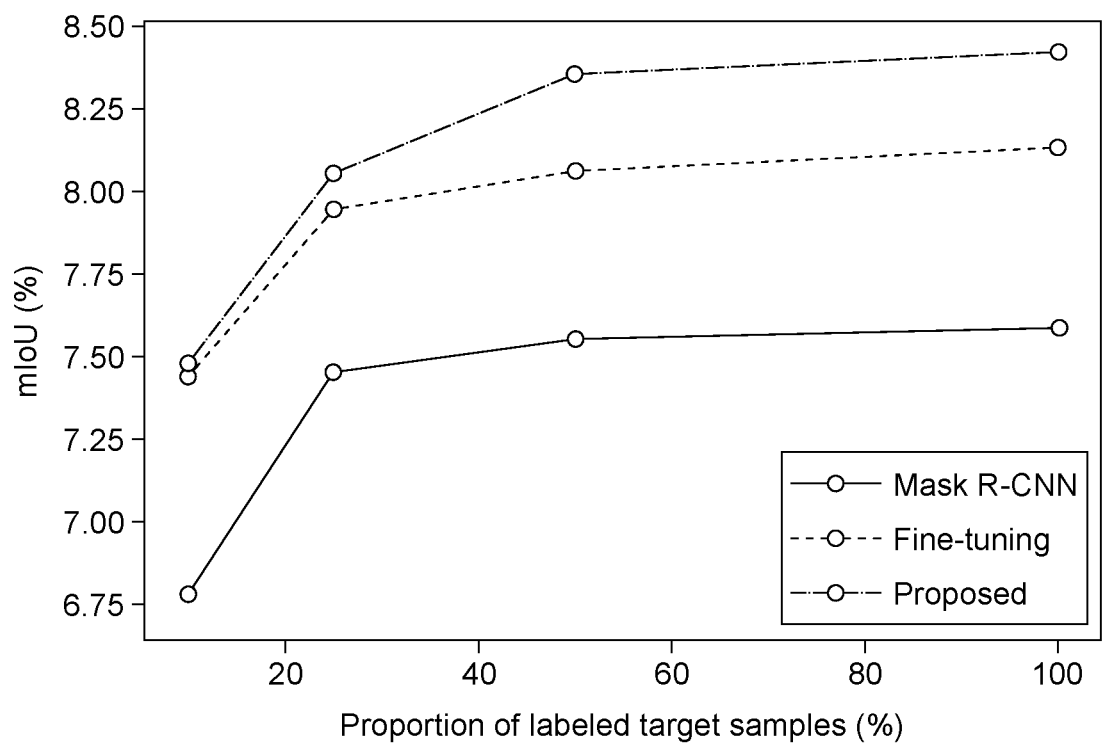
FIG. 4 illustrates a graph showing the percent mean intersection of union (mIoU) against the proportion of labelled target samples on a first dataset, comparing illustrative embodiments with conventional methods.
Figure 5:
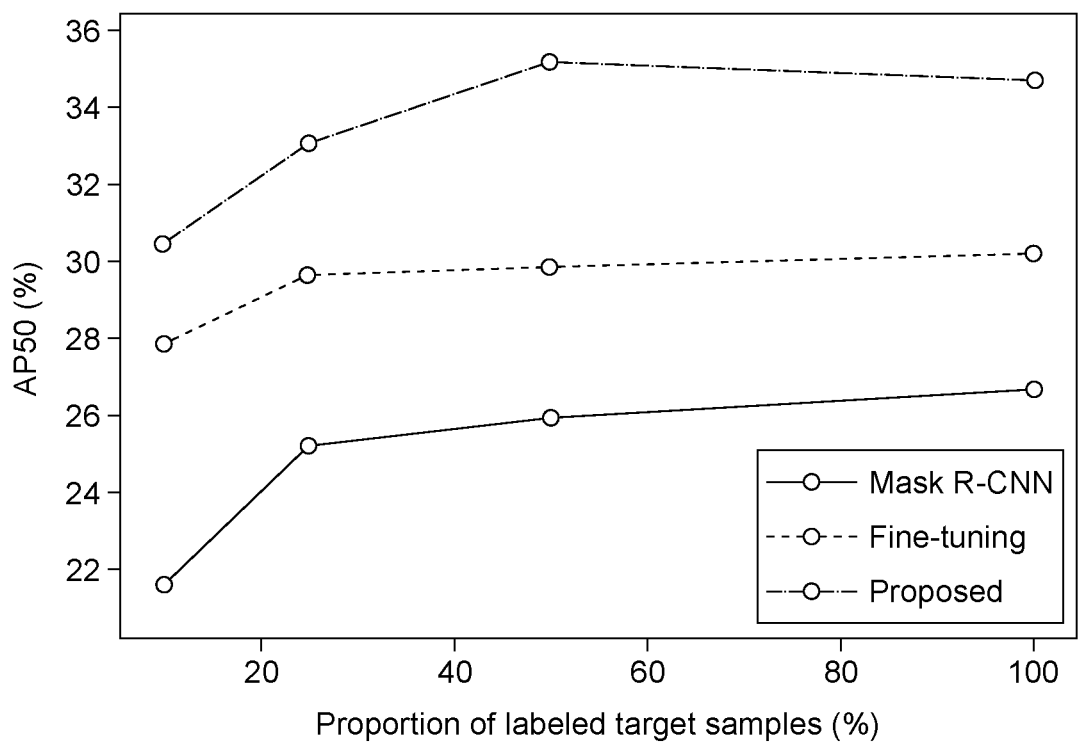
FIG. 5 illustrates a graph showing the average precision (AP50) against the proportion of labelled target samples on a first dataset, comparing illustrative embodiments with conventional methods.
Figure 6:
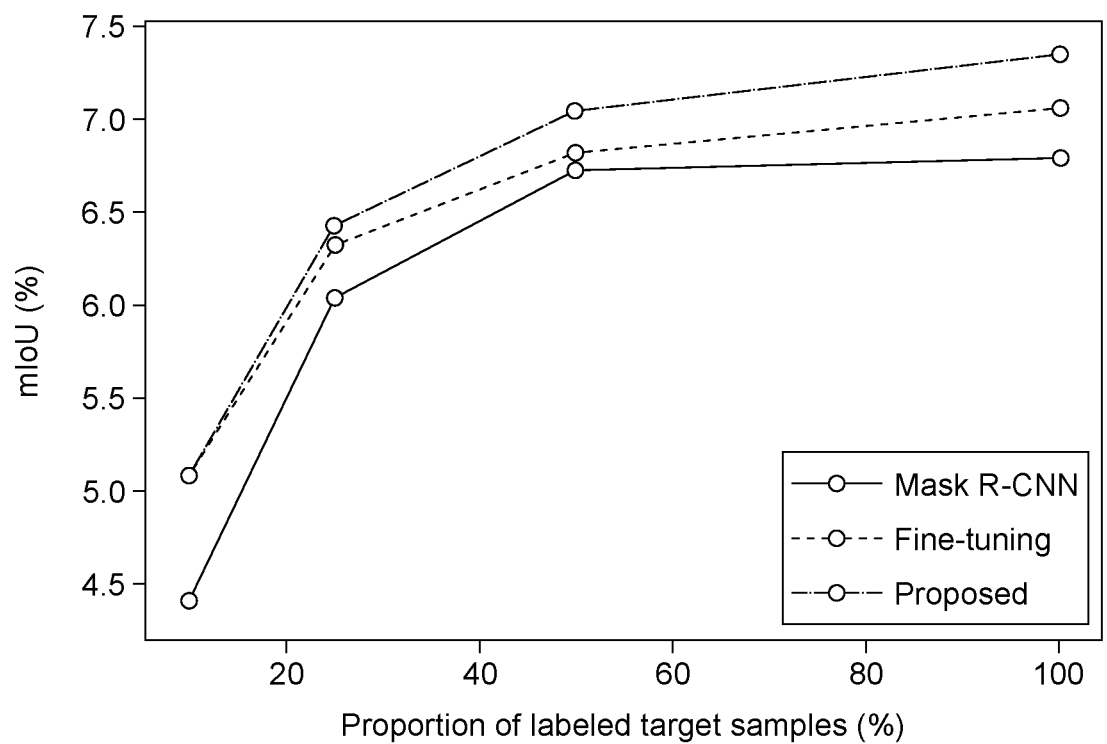
FIG. 6 illustrates a graph showing the percent mean intersection of union (mIoU) against the proportion of labelled target samples on a second dataset, comparing illustrative embodiments with conventional methods.
Figure 7:
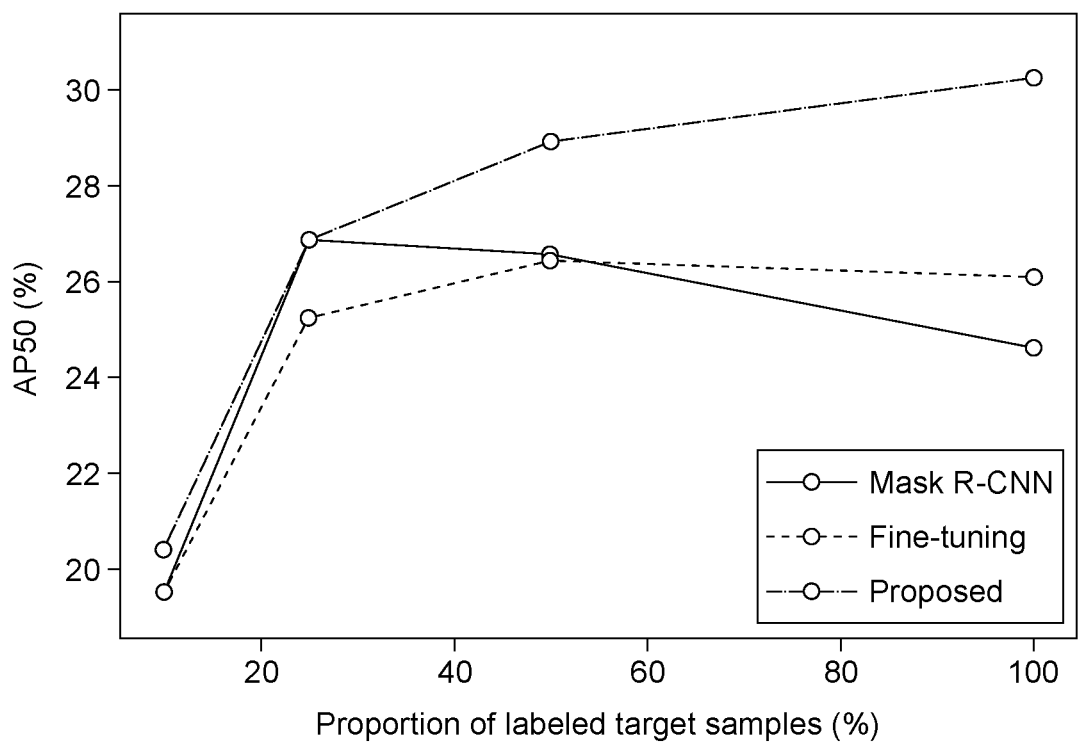
FIG. 7 illustrates a graph showing the average precision (AP50) against the proportion of labelled target samples on a second dataset, comparing illustrative embodiments with conventional methods.

Referring to FIG. 3, it can be seen that inputting the domain vector into multiple layers, especially the convolutional layers (the mask and ROI heads), improved the domain adaptation performance. The method "All" performed the best, where the domain vector and domain tensor are input into the mask head, the ROI head and the class and box.

Performances in multiple scenarios with different numbers of the labeled target samples were investigated. The number of labeled samples was gradually increased from the target domain for training the model and show each performance. Labeled target data for training the model was partially used. Thus, this example is a semi-supervised domain adaptation. Here, the mIoU and the average precision with 50% IoU threshold (AP50) were reported.

In FIGS. 4 through 7, the charts show the instance segmentation performance over the different numbers of labeled target samples for the baselines and the model according to the present disclosure. It can be seen that the proposed model, according to the present disclosure, showed a higher performance than the baselines in each case. This shows that the proposed model, according to the present disclosure, can accelerate learning regarding sample complexity/efficiency.

Figure 8:
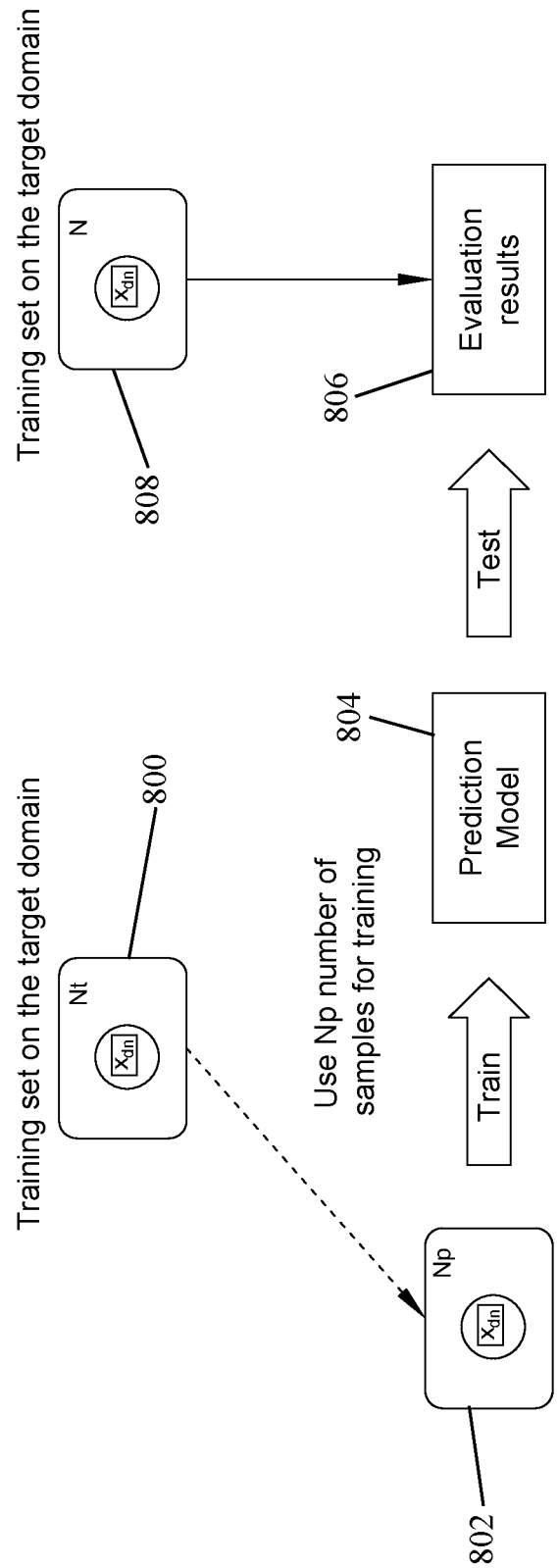
FIG. 8 illustrates a schematic representation of supervised learning on a target domain, according to an illustrative embodiment.

FIG. 8 illustrates a schematic representation of supervised learning on a target domain 800. In this figure, no samples are used from the source domain. A number of samples (Np) from the target domain 800 are used as a set 802 for training to generate a prediction model 804. The prediction model 804 is tested to provide evaluation results 806 that are compared with a training set 808 on the target domain.

Figure 9:
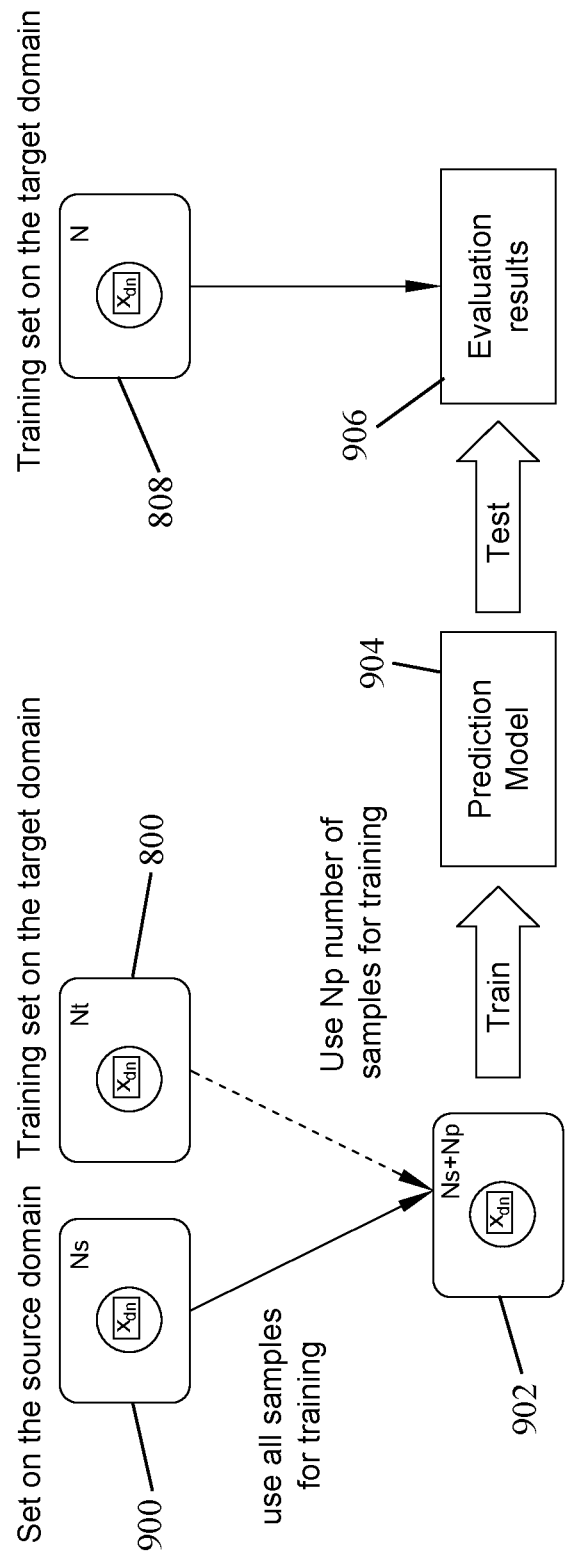
FIG. 9 illustrates a schematic representation of supervised learning on both a target domain and a source domain, according to an illustrative embodiment.

FIG. 9 illustrates a schematic representation of supervised learning on both a target domain and a source domain. A number of samples (Np) from the target domain 800 and all the samples from the source domain 900 are used as a set 902 for training to generate a prediction model 904. The prediction model 904 is tested to provide evaluation results 906 that are compared with a training set 808 on the target domain.

Figure 10:
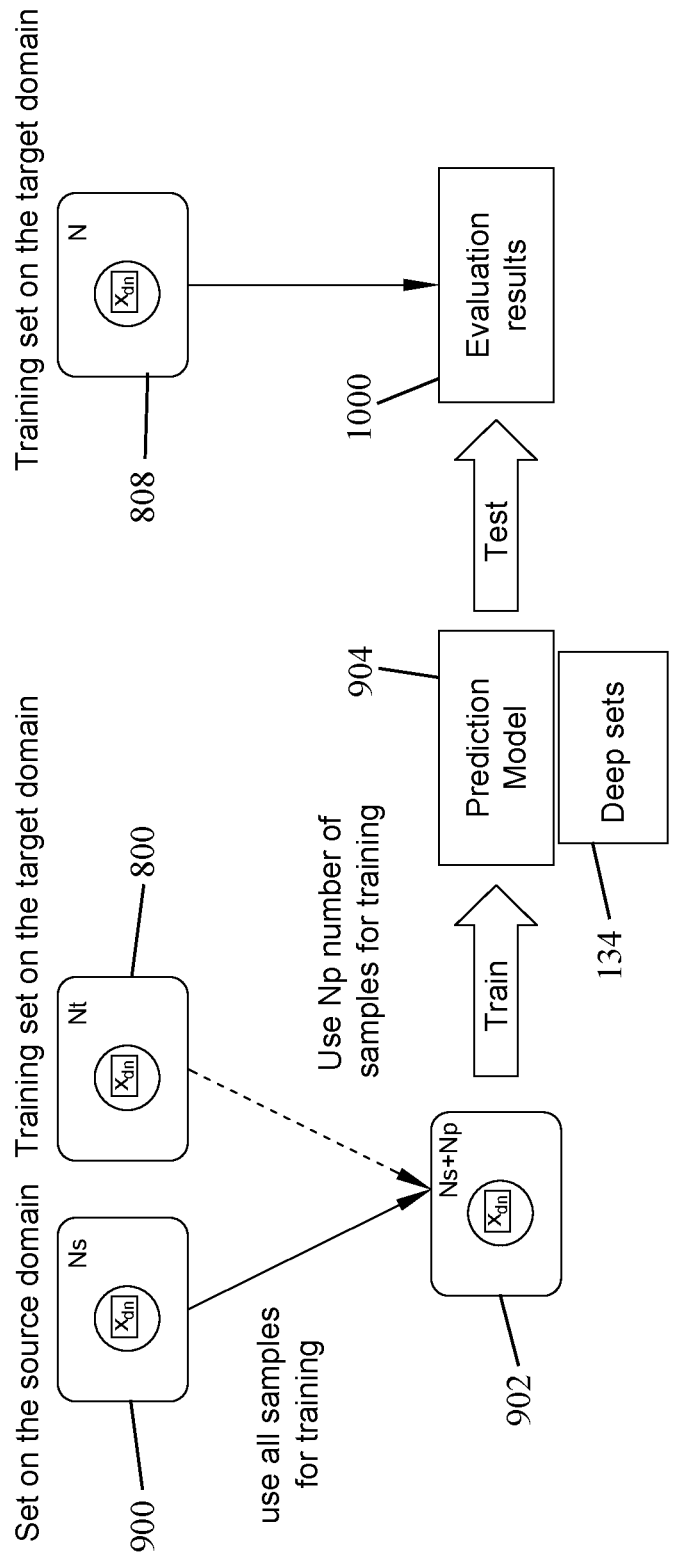
FIG. 10 illustrates a schematic representation of supervised learning on both a target domain and a source domain, with Deep sets, according to an illustrative embodiment.

FIG. 10 illustrates a schematic representation of supervised learning on both a target domain and a source domain, with Deep sets, according to an illustrative embodiment of the present disclosure. Similar to FIG. 9, a number of samples (Np) from the target domain 800 and all the samples from the source domain 900 are used as the set 902 for training to generate the prediction model 904. The prediction model 904 is tested, with Deep sets 134 (see FIG. 1) to provide evaluation results 1000 that are compared with the training set 808 on the target domain.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
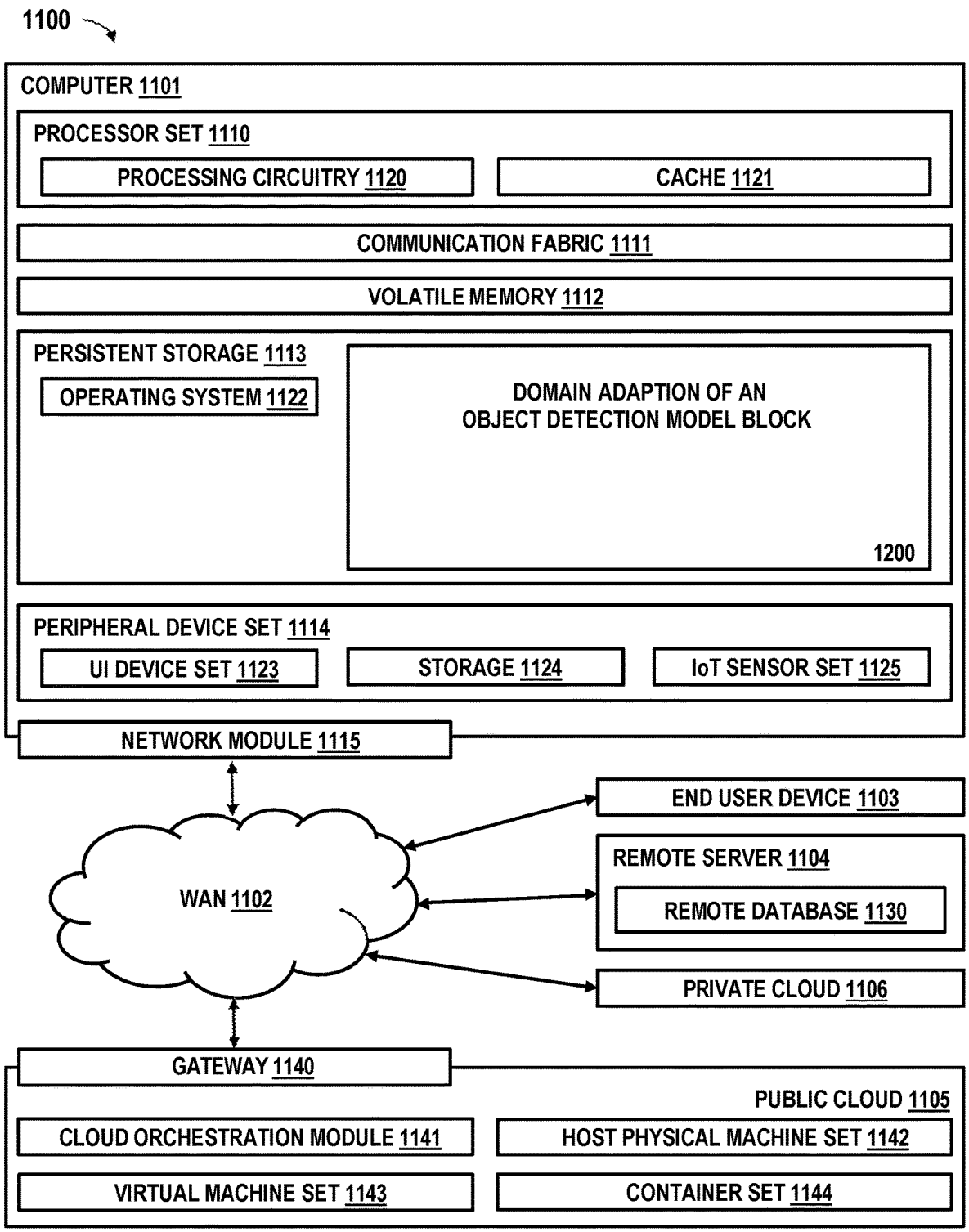
FIG. 11 is a functional block diagram illustration of a computer hardware platform that can be used to implement the method for enabling classical planning in an interactive environment with incomplete models, according to an illustrative embodiment.

Referring to FIG. 11, computing environment 1100 includes an example of an environment for the execution of at least some of the computer code involved in performing the inventive methods, such as a domain adaptation of an object detection model block 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail above, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for domain adaptation of an object detection model, the method comprising:
   obtaining a domain vector for a domain from one or more images in the domain, the domain vector representing a property of the domain;
   inputting the domain vector into layers in the object detection model;
   converting each image of the one or more images in the domain into an intermediate representation vector with a convolutional backbone of the object detection model and computing the domain vector from the intermediate representation vector; and
   outputting a target domain-specific result of the object detection model without requiring prior knowledge about a target domain.

2. The computer-implemented method of claim 1, wherein the inputting of the domain vector into the layers is done for a convolutional output layer by making a domain tensor, concatenating the domain tensor and a latent representation tensor from former layers of the convolutional output layer as a single tensor, and using the single tensor as an input of the convolutional output layer.

3. The computer-implemented method of claim 2, wherein the domain tensor is defined that a value of an element in the domain tensor is the same as a value of an element in the domain vector with the same index value as that of a first index value of the element in the domain tensor, and values of all elements in the domain tensor that have the same first index value are the same value regardless of a second index value and a third index value.

4. The computer-implemented method of claim 2, wherein the layers into which the domain tensor is input are a mask head and a region of interest (ROI) head of a mask region-based convolutional neural network (Mask R-CNN) model.

5. The computer-implemented method of claim 1, further comprising:
   inputting the domain vector and a latent representation vector from former layers into a bilinear layer as two different input vectors; and
   computing a single vector as an output of the bilinear layer, and using the single vector as an input for a fully connected layer.

6. The computer-implemented method of claim 1, wherein the object detection model is a mask region-based convolutional neural network (Mask R-CNN) model.

7. The computer-implemented method of claim 1, further comprising achieving the target domain-specific result without retraining the object detection model on a target domain.

8. The computer-implemented method of claim 1, further comprising achieving the target domain-specific result without preparing a labeled target data.

9. The computer-implemented method of claim 1, further comprising calculating the domain vector with Deep sets.

10. The computer-implemented method of claim 9, further comprising inferring the domain vector from sets of unlabeled images in a domain by the Deep sets.

11. A computer-implemented method for domain adaptation of an object detection model, the method comprising:
    obtaining a domain vector for a domain from one or more images in the domain, the domain vector representing a property of the domain;
    inputting the domain vector into layers in the object detection model; and
    outputting a target domain-specific result of the object detection model without requiring prior knowledge about a target domain,
    wherein the inputting of the domain vector into the layers is done for a fully connected output layer by concatenating the domain vector and a latent representation vector from former layers of the fully connected output layer as a single vector, and using the single vector as an input of the fully connected output layer.

12. The computer-implemented method of claim 11, wherein the layers into which the domain vector is input are a class head and a box head of a mask region-based convolutional neural network (Mask R-CNN) model.

13. A computer-implemented method for domain adaptation of an object detection model, the method comprising:
    obtaining a domain tensor for a domain from one or more images in the domain, the domain tensor representing a property of the domain;
    inputting the domain tensor into convolutional layers of the object detection model;
    inputting the domain tensor into a mask head and a region of interest (ROI) head of the object detection model; and
    outputting a domain-specific result of the object detection model,
    wherein the object detection model is a mask region-based convolutional neural network (Mask R-CNN) model.

14. The computer-implemented method of claim 13, further comprising:
    obtaining a domain vector for the domain from the one or more images in the domain, the domain vector representing a property of the domain; and
    inputting the domain vector into a fully connected layer in the object detection model,
    wherein the fully connected layer is a class head and a box head of the object detection model.

15. The computer-implemented method of claim 13, further comprising:
    achieving the domain-specific result without retraining the object detection model on a target domain; and
    achieving the domain-specific result without preparing a labeled target data.

16. A non-transitory computer readable storage medium tangibly embodying a computer readable program code having computer readable instructions that, when executed, causes a computer device to carry out a method for domain adaptation of an object detection model, the method comprising:
    obtaining a domain vector for a domain from one or more images in the domain, the domain vector representing a property of the domain;
    inputting the domain vector into layers in the object detection model;
    obtaining a domain tensor for the domain from the one or more images in the domain, the domain tensor representing a property of the domain;
    inputting the domain tensor into convolutional layers of the object detection model; and
    inputting the domain tensor into a mask head and a region of interest (ROI) head of the object detection model; and
    outputting a domain-specific result of the object detection model.

17. A computer-implemented method for domain adaptation of an object detection model, the method comprising:

obtaining a domain vector for a domain from one or more images in the domain, the domain vector representing a property of the domain;

inputting the domain vector into layers in the object detection model, wherein the inputting of the domain vector into the layers is done for a convolutional output layer by making a domain tensor, concatenating the domain tensor and a latent representation tensor from former layers of the convolutional output layer as a single tensor, and using the single tensor as an input of the convolutional output layer; and outputting a target domain-specific result of the object detection model without requiring prior knowledge about a target domain.

18. A computer-implemented method for domain adaptation of an object detection model, the method comprising:

obtaining a domain vector for a domain from one or more images in the domain, the domain vector representing a property of the domain;

inputting the domain vector into layers in the object detection model;

inputting the domain vector and a latent representation vector from former layers into a bilinear layer as two different input vectors;

computing a single vector as an output of the bilinear layer, and using the single vector as an input for a fully connected layer; and outputting a target domain-specific result of the object detection model without requiring prior knowledge about a target domain.

19. A computer-implemented method for domain adaptation of an object detection model, the method comprising:

inferring a domain vector for a domain from sets of unlabeled images in the domain by Deep sets, the domain vector representing a property of the domain;

training the object detection model and the Deep Sets together;

sharing parameters of the object detection model and the Deep Sets among all domains;

generalizing inference for domain vectors among the domains without retraining the object detection model or the Deep Sets on an unseen domain;

inputting the domain vector into layers in the object detection model; and outputting a target domain-specific result of the object detection model without requiring prior knowledge about a target domain.

20. A computer-implemented method for domain adaptation of an object detection model, the method comprising:

inferring a domain vector from sets of unlabeled images in the domain by Deep sets, the domain vector representing a property of the domain;

inputting the domain vector into layers in the object detection model;

inputting the domain vector into an autoencoder, wherein the autoencoder, the object detection model, and the Deep sets are trained together; and outputting a target domain-specific result of the object detection model without requiring prior knowledge about a target domain.

* * * * *